United States Patent [19]
Jung

[11] 3,877,678
[45] Apr. 15, 1975

[54] DEVICE FOR CLOSING A ROUND HOT AIR OR EXHAUST DUCT

[75] Inventor: Richard Jung, Gummersbach, Germany

[73] Assignee: L & C Steinmuller GmbH, Gummersbach, Germany

[22] Filed: Feb. 11, 1974

[21] Appl. No.: 441,656

[30] Foreign Application Priority Data
July 7, 1973   Germany............................ 2334683

[52] U.S. Cl. .............................................. 251/305
[51] Int. Cl. .............................................. F16k 1/22
[58] Field of Search ........... 251/305, 118, 306, 307, 251/173, 308; 137/375

[56] References Cited
UNITED STATES PATENTS

| | | | |
|---|---|---|---|
| 824,166 | 6/1906 | Aiken ............................... | 251/305 X |
| 2,059,656 | 11/1936 | Ring..................................... | 251/173 |
| 2,095,263 | 10/1937 | Moss................................. | 251/305 X |
| 2,789,785 | 4/1957 | Woods................................ | 251/174 |
| 3,420,262 | 1/1969 | O'Neill, Jr. .......................... | 137/375 |
| 3,442,489 | 5/1969 | Cary et al. .......................... | 251/305 |
| 3,640,499 | 2/1972 | Jung..................................... | 251/305 |
| 3,753,548 | 8/1971 | Jung et al. ........................... | 251/305 |

Primary Examiner—Martin P. Schwadron
Assistant Examiner—Robert J. Miller
Attorney, Agent, or Firm—McGlew and Tuttle

[57] ABSTRACT

A device for closing a round hot air or exahust gas duct comprises a symmetrically mounted pivoted flap having a pivot web portion centrally pivoted in said duct and a substantially cylindrical flap wing with a peripheral closing edge. The flap is arranged inside of a flexible cylindrical insert of thin metal or plastic material which is arranged in the duct so that it is spaced radially inwardly from the interior wall thereof. The insert is connected to and sealed with the duct on at least one end face. The inside diameter of the insert is slightly smaller than the outside diameter of the flap wing, and the flap wing is provided with a circumferentially extending rib which is attached to the flap wing adjacent the closing end thereof.

3 Claims, 2 Drawing Figures

DEVICE FOR CLOSING A ROUND HOT AIR OR EXHAUST DUCT

BACKGROUND OF THE INVENTION

FIELD OF THE INVENTION

This invention relates in general to the construction of flow controlling devices and, in particular, to a new and useful device for closing a round hot air or exhaust duct.

DESCRIPTION OF THE PRIOR ART

The present invention is particularly designed for use in the closing of a round hot air or exhaust duct in situations where there can be no major temperature difference in the closing position between the cylindrical insert or closing jacket surrounding a pivoted valve flap and the wing of the valve flap itself. In hot gas ducts, however, such a temperature difference cannot be excluded in a transition phase following the closing of the flap. The thin closing jacket can cool off faster than the flap wing, which has a substantially higher heat capacity. As a result of the prevention of the shrinkage of the jacket, a super-elevated radial pressure is produced at the closing edge, which has the effect that the opening moment is unduly increased and the closing jacket remains deformed. In addition, a temperature increase of the closing jacket which leads to the heating of the flap wing is possible after a cold air current has been shut off, for example, when the air duct opens into a hot air duct. Because the temperature of the flap wing does not rise as fast as the jacket, the jacket will open beyond the original closing position. The subsequent temperature convergence of both elements produces a thermal stress in the closing jacket.

When steel is used, and this is practially the only material to be considered for such a shutoff element, an amount of about 40 K is considered the maximum admissible difference between the jacket temperature in the range of the closing plane and the temperature means of the flap wing determinant for the thermal expansion. The appearance of the thermal stresses in the closing jacket as a result of its varying thermal expansion relative to the flap wing is limited to the so-called self-locking flap, where the friction at the closing edge prevents accidental opening under the influence of thermal stress. An arrangement without this self-locking feature requires an inclined position of the flap and the deformability of the jacket by the given closing moment is not sufficient for a tight seal. The divergence of the temperature of the closing jacket and the flap wing in the transition phase after the closing of the flap can be expected, for example, in the ducts of a combustion gas turbine-steam power plant leading to the steam generator furnace. In this case, the presently used closing jacket flap is shielded thermally by a series-connected simple pivoted flap.

SUMMARY OF THE INVENTION

In accordance with the present invention, the symmetrically mounted pivoted flap is designed so that there is no super-elevation of the opening moment due to the divergence of the temperatures of the closing jacket and the flap so that a permanent deformation of the closing jacket is avoided. For this purpose, the invention provides a circumferential rib in the form of a collar or closing edge formation on the pivoted flap arranged adjacent to the peripheral closing edge of the flap and extending substantially axially.

With the inventive construction, the closing jacket is covered by the collar or rib in the zone which is of sufficient width adjoining the closing plane so that it is thermally shielded. Between the jacket and the rib, there remains a small gap in which the heat transfer is limited only to an exchange between the rib and the closing jacket. By designing the construction with adequate rib thickness, the rib temperature is equal to the temperature of the flap wing at the rib base so that the jacket temperature at the closing edge differs from the temperature of the flap wing merely because of the heat conduction in the thin-walled jacket. On its exterior, the closing jacket is in heat exchange with the casing wall or duct wall. The temperature of the wall is identical at the closing time with the outside temperature and this is the same everywhere in the system. The casing can therefore only exert an equalizing influence on the temperature difference between the closing jacket and the flap wing.

Accordingly, it is an object of the invention to provide a device for closing a round hot air or exhaust duct, which comprises a symmetrically mounted pivoted flap having a pivot web portion and a substantially cylindrical flap wing with a peripheral closing edge which is arranged inside of a flexible cylindrical insert of thin material in the gas duct, and which includes a circumferentially extending rib attached on the downstream side of the flap adjacent to its peripheral closing edge.

A further object of the invention is to provide a device for closing hot air ducts which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF A PREFERRED EMBODIMENT

Figure 1:
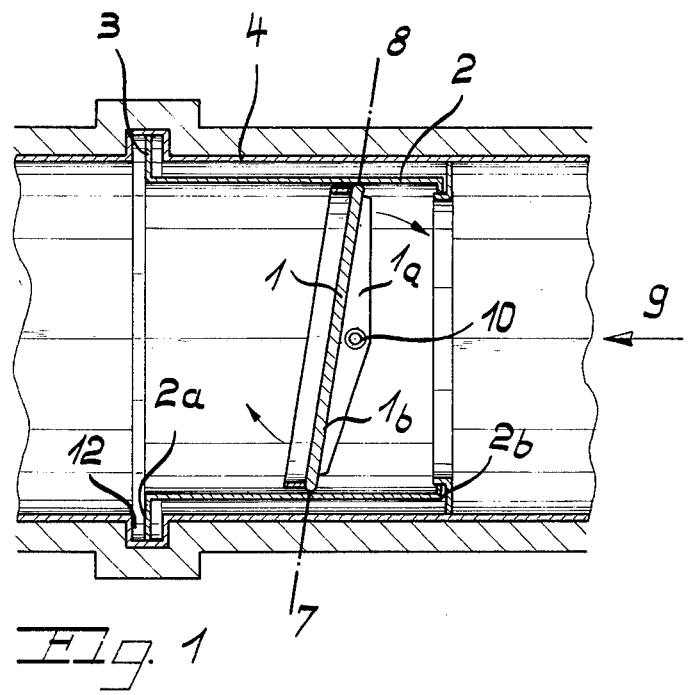
FIG. 1 is a partial longitudinal sectional view of a gas duct having a closing device therein constructed in accordance with the invention.

Referring to the drawings in particular, the invention embodied therein, comprises a closing device for closing a round hot air or exhaust gas duct, which has a rigid wall or casing 4. The device includes a flap wing, generally designated 1, which includes a web portion 1a which is pivotally mounted on a pivot 10 in the duct and which also includes a flap wing portion 1b of generally cylindrical configuration. The flap 1 is pivotally mounted within an insert or closing jacket 2 which has a downstream end 2a which is secured in a U-shaped trough portion 12 of casing 4 and held in position by a flexible diaphragm 3. The opposite end is provided with a flange 2b which holds this end at a spaced location from the interior of rigid casing 4.

In accordance with the invention, on the rear side or downstream side of the flap wing 1, there is attached a circumferential rib 6 which is arranged close to a peripheral closing edge 5 of the flap wing. Rib 6 extends substantially axially as indicated, and it extends outwardly from the closing plane 7-8, as shown in FIG. 1. The heighth or length of the rib from flap wing 1b outwardly must be so adapted to the wall thickness of the closing jacket 2 that the state of stress and the temperature of the closing jacket 2 in the closing plane 7-8 are only insignificantly influenced by a temperature change of jacket 2 outside of the shielded zone.

Figure 2:
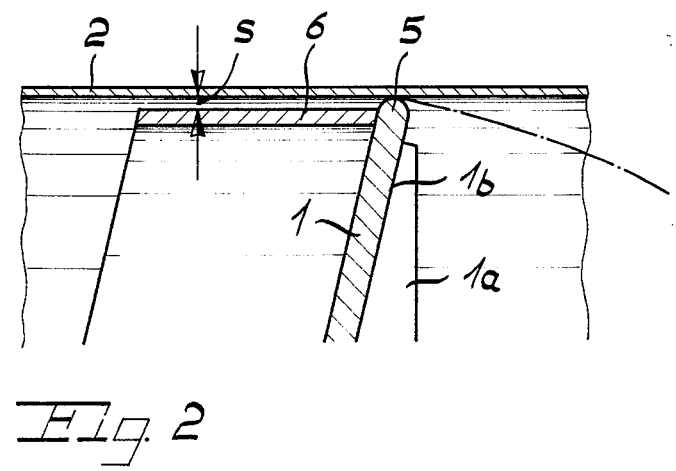
FIG. 2 is an enlarged partial sectional view of a portion of the elements shown in FIG. 1.

In FIG. 2, the upper portion of the flap wing 1 and insert 2 are shown on an enlarged scale. The closing edge 5 is shown in a closing position. The gap width S between circumferentially extending rib 6 and insert 2 should be selected as small as possible according to the invention. Care should be taken that the collar formed by rib 6 does not hinder the closing and opening of flap wing 1 when selecting the gap width S as being as small as possible.

In general, a circulating flow varying the temperature of the system is only possible on the rear side of the closed flap 1. In special cases, however, the direction of flow is sometimes reversed from the direction of flow indicated by arrow 9 in FIG. 1. In such cases, a shielding rib, similar to rib 6, must be placed on the opposite side of the flap in addition to the one which is already present when the flow directions are usually reversed at times.

The advantage of the device of the invention is that a thermal shield of the closing jacket in a zone adjacent to the closing plane is achieved by rib 6 so that a superelevated opening moment and a permanent deformation of the closing jacket in the closing position of the flap are avoided.

While a specific embodiment of the invention has been shown and described in detail to illustrate the application of the principles of the invention, it will be understood that the invention may be embodied otherwise without departing from such principles.

What is claimed is:

1. A device for closing a round hot air or exhaust gas duct, comprising a symmetrically mounted pivoted flap having a pivot web portion and a substantially cylindrical flap wing with a peripheral closing edge, a flexible cylindrical insert of thin material arranged in the duct in the range of and extending around said flap, said insert having at least one of its two ends sealed with said duct, the inside diameter of said insert being slightly smaller than the outside diameter of said flap wing, and a closed annular circumferentially and axially extending rib attached at least on the downstream side of said flap wing adjacent to said closing edge.

2. A device for closing a round hot air or exhaust gas duct, according to claim 1, wherein said insert end which is sealed with said duct comprises a flange extending into sealing engagement with said duct wall and an annular flexible diaphragm surrounding said duct on the exterior of said flange.

3. A device for closing a round hot air or exhaust gas duct, according to claim 1, wherein said circumferential rib comprises a sleeve substantially parallel to the wall of said insert and defining a very small gap therewith.

* * * * *